United States Patent [19]

Miller

[11] Patent Number: 4,629,835
[45] Date of Patent: Dec. 16, 1986

[54] FAULT ISOLATING APPARATUS SYSTEM AND METHOD

[75] Inventor: Brian L. Miller, Natick, Mass.

[73] Assignee: New England Telephone and Telegraph Company, Boston, Mass.

[21] Appl. No.: 686,253

[22] Filed: Dec. 26, 1984

[51] Int. Cl.[4] .............................................. H04B 3/46
[52] U.S. Cl. ...................................................... 379/29
[58] Field of Search ................ 179/175.3 F, 175.3 A, 179/175.3 R, 175.1 R, 175.25, 27 G, 19, 16 A, 16 AA, 175.2 C; 324/52

[56] References Cited

U.S. PATENT DOCUMENTS

| | | | |
|---|---|---|---|
| 3,636,280 | 1/1972 | Wetzel | 179/175.3 |
| 4,399,333 | 8/1983 | Gewitz et al. | 179/175.3 |
| 4,415,779 | 11/1983 | Bowman | 179/175.3 F |
| 4,438,299 | 3/1984 | Tomim | 179/175.3 F |

Primary Examiner—Stafford D. Schreyer
Attorney, Agent, or Firm—John J. Jordan; John J. Torrente

[57] ABSTRACT

A fault isolating apparatus, system and method employing a fault isolator comprising first, second, third and fourth ports, the first and third ports being adapted to be connected to the ring and tip lines of a subscriber loop and the second and fourth ports being adapted to be connected to a subscriber location; and first and second circuit means connected between the first and second ports and the third and fourth ports, the first circuit means being adapted to block the passage of current from the first to the second port and to allow the passage of current from the second to the first port and the second circuit means being adapted to allow passage of current from the third to fourth port and to block passage of current from fourth to the third port.

19 Claims, 4 Drawing Figures

FAULT ISOLATING APPARATUS SYSTEM AND METHOD

BACKGROUND OF THE INVENTION

This invention relates to a telephone fault location apparatus system and method and, in particular, to an apparatus, system and method for isolating faults as between the telephone network provided by a telephone company and the subscriber locations served by such network.

As can be appreciated, with the present restructuring of the telecommunications industry, a local telephone company is responsible for repair and maintenance only to the point at which the company's network interfaces with the telephone equipment of its subscribers. Usually, this so-called "network interface" is at a telephone box on the subscriber location and it is at this box that the telephone lines of the company connect to the subscriber equipment.

In order to minimize the cost and labor involved with repair and service calls, local telephone companies have sought ways of determining on which side of the network interface a fault in the telephone transmission has occurred. In this way, the telephone company can assess whether a particular fault is its responsibility, and only in such cases is a repairman dispatched to correct the fault. A significant savings in labor and money is thereby realized since repairmen are no longer dispatched where correction of a fault lies with the subscriber.

Presently developed apparatus, systems and methods for determining fault location are complex and usually involve some type of switching circuitry. Efforts are underway, however, to develop less complicated passive equipment which allows for fault isolation in a simple and inexpensive way.

It is, therefore, an object of the present invention to provide an apparatus, system and method for assessing the responsibility for faults as between a telephone company and its subscribers.

It is a futher object of the present invention to provide an apparatus, system and method for isolating faults as occurring in telephone company lines or in subscriber locations served by such lines.

It is yet a further object of the present invention to provide an apparatus arrangeable at the network interface for aiding in the isolating of faults as between a telephone line and a subscriber location.

SUMMARY OF THE INVENTION

In accordance with the principles of the present invention, the above and other objectives are realized in a fault isolation apparatus including a fault isolator having first, second, third and fourth ports. A first circuit means connects the first and second ports and a second circuit means connects the third and fourth ports. The first circuit means is adapted to block current moving from the first to second port and to pass current moving from the second to the first port and the second circuit means is adapted to pass current moving from the third to the fourth port and to block current moving from the fourth to the third port.

The aforesaid fault isolation apparatus is connected at the network interface between a subscriber location and the tip and ring lines of a telphone company loop serving the subscriber. The telephone central office serving the loop is provided with means for applying voltages of opposite polarity to the tip line and the ring line. By selective application of these voltages in the presence of the isolation apparatus, the location and nature of faults occurring in the telephone transmission can be determined. In particular, in response to these voltages the fault isolator causes selective current transmission over the tip and ring lines which when measured in the central office provides an indication of the nature of any fault and whether the fault is located on the subscriber loop or at the subscriber location.

Preferably, the fault isolator is also provided with third and fourth circuit means connected between the first and second ports and the third and fourth ports, respectively, each of these means being adapted to pass low frequency current in either direction between their respective ports. This allows the isolator to pass ringing currents and the isolator, therefore, does not interfere with the normal ringing function in the telephone circuit.

It is further preferable, in accordance with the invention, to provide the fault isolation apparatus with fifth and sixth circuit means connecting the first and third ports and the second and fourth ports, respectively, of the fault isolator. The fifth circuit means is adapted to pass current moving from the first to the third port and to block current moving in the opposite direction, while the sixth circuit means is adapted to pass current moving from the fourth to second port and to block current moving in the opposite direction. By selecting the fifth and sixth circuit means to exhibit different preselected impedances when passing current, these means upon appropriate application of the opposite polarity voltages enable a determination to be made that the fault isolator is suitably interconnected and in proper working order.

BRIEF DESCRIPTION OF THE DRAWINGS

The above and other features and aspects of the present invention, will become more apparent upon reading the following detailed description in conjunction with the accompanying drawings, in which.

DETAILED DESCRIPTION

Figure 1:
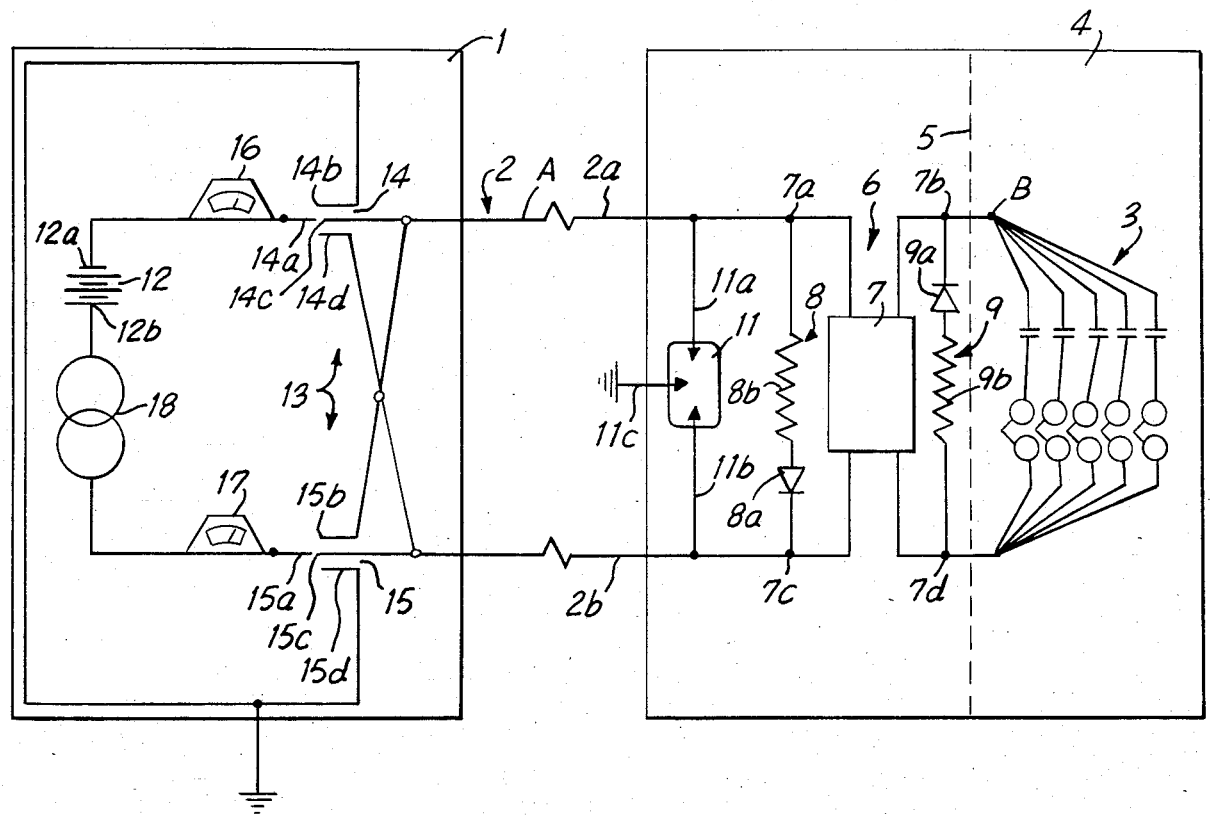
FIG. 1 shows a telephone communication system employing a fault isolation apparatus, system and method in accordance with the principles of the present invention.

In FIG. 1, a telephone central office 1 is connected via subscriber loop 2 to a plurality of telephone sets 3 (shown on hook) located at a subscriber location 4. The subscriber loop comprises a ring conductor 2a and a tip conductor 2b which interface with the telephone sets 3 at the so-called network interface 5. The latter interface defines the point at which the telephone company's network ends and the subscriber's equipment takes over the telephone communication.

As can be appreciated, the telephone company's responsibility for telephone communication stops on the central office side of the network interface 5. As a result, it is important that the telehone company be able to determine whether a problem in communcation is due to a fault condition on the central office or subscriber side of the network interface. Otherwise, the telephone company might dispatch repairmen to correct fault conditions which are not its responsibility, thereby incurring unwarranted costs in time and manpower.

In accordance with the principles of the present invention, the system of FIG. 1 is adapted to enable a determination of the nature of a fault and whether the fault is on the central office or subscriber side of the network interface. More particularly, as shown in FIG. 1, a fault isolation apparatus 6 is inserted at the network interface 5 between the ends of the tip and ring lines 2a and 2b of the loop 2 and the subscriber location 4. The fault isolation apparatus 6 comprises a fault isolator 7 which has four ports or terminals 7a, 7b, 7c and 7d and which, in accordance with the principles of the present invention, is adapted to exhibit a preselected current characteristic for current passing between its ports.

More particularly, the isolator 7 includes circuit means which is adapted to block current moving from port 7a to port 7b, and to pass current moving from port 7b to port 7a. The isolator 7 further includes additional circuit means which blocks current passing from port 7d to port 7c but which passes current passing from port 7c to port 7d. It is also preferable that the isolator 7 further include circuit means which allow for passage of low frequency signals below about 22 Hz between the ports 7a and 7b and between the ports 7c and 7d. With such means, ringing currents can pass over the loop 2 to the telephone sets 3 in usual fashion. Finally, the isolator 7 is further adapted to block current passing from port 7a to ports 7c and 7d, from port 7b to ports 7c and 7d, from port 7c to ports 7a and 7b and from port 7d to ports 7b and 7a.

In addition to the fault isolator 7, the fault isolation apparatus 6 further comprises preselected current selective devices or circuit means 8 and 9. The circuit means 8 is connected across the ports 7a and 7c of the isolator 7 and is adapted to pass current from port 7a to port 7c with a first preselected impedance and to block current passing from port 7c to port 7a. The circuit means 9, in turn, is connected between ports 7b and 7d of the isolator 7 and is adapted to pass current fom port 7d to port 7b and to block current passing from port 7b to port 7d. In passing current, the circuit means 9, in turn, exhibits a second a preselected impedance.

As above indicated, the fault isolation apparatus 6 has been situated at the end of subscriber loop 2 . As shown, a three element gas tube 11 is situated to the central office side of the isolation apparatus. The tube 11 has elements 11a, 11b and 11c, two of which 11a and 11b, are connected to the ports 7a and 7c of the fault isolator 7 and one of which, 7b is locally grounded.

With the fault isolation apparatus 6 arranged as above-described, the apparatus enables faults in the telephone circuit to be isolated to the loop 2 or the subscriber location 4 upon suitable signalling from the central office 1. In particular, the central office 1 is adapted to apply signals of opposite polarity to either one or both of the tip and ring lines 2a and 2b.

To this end, the central office 1 includes a d.c. source 12 which is connected to a switch arrangement 13 for selectively coupling the source to the lines 2a and 2b. As shown, the switch arrangmeent includes first and second single pole triple throw switches 14 and 15 whose movable contacts 14a and 15a are connected to the negative and positive terminals 12a and 12b of the battery 12. The stationary contacts 14b, 14c and 14d of the switch 14 are, in turn, connected to ground, the ring line 2a and the tip line 2b, respectively. The stationary contacts 15b, 15c and 15d of the switch 15, on the other hand, are connected to ring line 2a, tip line 2b and ground, respectively.

The central office 1 is also provided with current meters 16 and 17 which are connected between movable contacts 14a and 15a and the battery terminals 12a and 12b, respectively. An a.c. source 18 is also situated between meter 17 and battery terminal 12b.

With the central office 1 so equipped, appropriate signalling by the central office can now be carried out in conjunction with the fault isolation apparatus 6 to provide readings in the meters 16 and 17 which are indicative of the location of a fault (i.e., whether the fault is on the central office side or the subscriber side of the interface 5) and of the type of fault (open, short, cross connection, etc.). More particularly, in operation, the movable contacts 14a and 15a are first set to bridge the stationary contacts 14c and 15c, respectively. This causes current to flow through meter 17 into tip line 2b from tip line 2b into apparatus 6 at port 7c of isolator 7, from port 7c to port 7d of isolator 7, from port 7d of isolator 7 through current device 9, from device 9 to port 7b of isolator 7, from port 7b of isolator 7 to port 7a of isolator 7, from port 7a of isolator 7 to ring line 2a, from ring line 2a to contacts 14a and 14b of switch 14, and from contact 14a of switch 14 through meter 16 to battery 12. The current readings in meters 16 and 17 will, thus, have unique values due to the preselected impedance of device 9.

After recording this reading, the switches 14 and 15 are then changed so that contact 14a now connects to stationary contact 14d and contact 15a now connects to stationary contact 15b. This causes a reversal of the applied voltage and therefore current flow. In particular, current now flows through meter 17 to contacts 15a and 15b of switch 15, from contact 15b of switch 15 to ring line 2a, from ring line 2a to port 7a of isolator 7, from port 7a of isolator 7 through current device 8, from device 8 to port 7c of isolator 7, from port 7c of isolator 7 to tip line 2b, from tip line 2b to contacts 14d and 14a of switch 14, and from contact 14a of switch 14 through meter 16 to battery 12. In this case, since the current passes through device 8, the currents in meters 16 and 17 will again have unique values this time related to the preselected impedance value of device 8.

With a no fault condition in the telephone circuit, the above procedure will result in two sets of readings for the two switch positions. These readings will correlate to the preselected impedances of devices 8 and 9 and, if proper correlation is found, will confirm that the isolation apparatus 6 is in proper working order. If there is a failure to properly correlate, it will be understood that the isolation apparatus 6 is not in proper working order and that a repairman should be sent to make repairs.

If a fault condition such as, for example, an open circuit should now occur at point A on ring line 2a, this fault can now be located by the presence of a unique set of readings on the meters 16 and 17. In testing for this condition, the switches 14a and 15a are again set to the two positions just described (i.e., first to contacts 14c and 15c and then to contacts 14d and 15b).

However, as can be appreciated, with an open circuit at point A, no current will flow for either of these switch positions. As a result the meters 16 and 17 will read no current (i.e., a fault condition) for both these positions. These readings will thus be interpreted as indicative of a fault condition on the central office side of the interface 5 and, in particular, will signify to the person conducting the test that an open circuit exists in the loop 2.

Having seen how a fault condition on the central office side of interface 5 is found and isolated, let it now be assumed that a fault condition arises on the subscriber side of the interface. Thus, let it be assumed that a ground appears at the point B in the subscriber circuit.

To test for this condition, contact 14a is connected to contact 14c and contact 15a is connected to contact 15d. With the contacts so connected, a negative voltage is applied to ring line 2a and current flows from the battery 12 through meter 17, from meter 17 to contact 15d, of switch 15, from contact 15d of switch 15 to ground, from gound to port 7b of the isolator 7, from port 7b of isolator 7 to the port 7a of isolator 7, from port 7a of isolator 7 through to ring line 2a, from ring line 2a to contacts 14c and 14a, and from contact 14a of switch 14 through meter 16 to the battery 12. Current readings are thus recorded in the meters 16 and 17.

The switches 14a and 15a are then switched so that contact 14a connects to contact 14b and contact 15a connects to contact 15b. As a result, a positive voltage is applied to ring line 2a through meter 17 and contacts 15a and 15b. This voltage attempts to induce current flow into port 7a of isolator 7. However, since isolator 7 blocks current flow from its port 7a to its port 7b, no current will flow and the meters 16 and 17 will reflect the absence of current flow. Thus, in this case, unique meter readings will again result with the application of opposite polarity voltages and these unique readings will be indicative that a ground exists on the subscriber side of the interface.

Other fault conditions, such as ground on ring line 2a, cross connection between lines 2a and 2b, cross connection at the subscriber location will also provide unique readings on the meters 16 and 17 indicative of the fault and its location. For testing the various conditions, the switch positions, current conditions and meter readings can be readily determined.

As can be appreciated, therefore, in testing for fault conditions utilizing the fault isolation apparatus 6 and the equipment in the central office (battery 12, meters 16 and 17 and switch 13), a fault condition on the central office side of the interface 5 will always register as a fault for both of the opposite polarity voltages used to test the condition. On the other hand, if the fault condition is on the subscriber side, a fault will register for only one of the opposite polarity voltages evidencing that the fault is on the subscriber side.

As shown in FIG. 1, the current selective devices 8 and 9 can typically each comprise a serial connection of a diode and a resistor. In FIG. 1, device 8 comprises diode 8a and resistor 8b and device 9 comprises diode 9a and resistance 9b. Typical resistance values for the resistors 8b and 9b might be 0.47 megaohms and 1 megaohm, respectively.

One preferable form of fault isolator 7 is an electronic chip. Such a chip, for example, would exhibit the following impedances for low frequency signals of less than 20 Hz: a low impedance less than 10 ohms for currents passing both ways between ports 7a and 7b and between ports 7c and 7d; a high impedance greater than 10 megaohms for currents passing in any direction between any other pairs of ports 7a, 7b, 7c and 7d. Without such low frequency signal and with a d.c. signal applied the impedances exhibited would be as follows: a high impedance greater than 10 megaohms for current passing from port 7a to 7b and from port 7d to port 7c; a low impedance less than 10 ohms for current passing from port 7b to port 7a and from port 7c to port 7d; and a high impedance greater than 10 megaohms for current passing in any direction between any other pairs of ports 7a, 7b, 7c and 7d.

Figure 2:
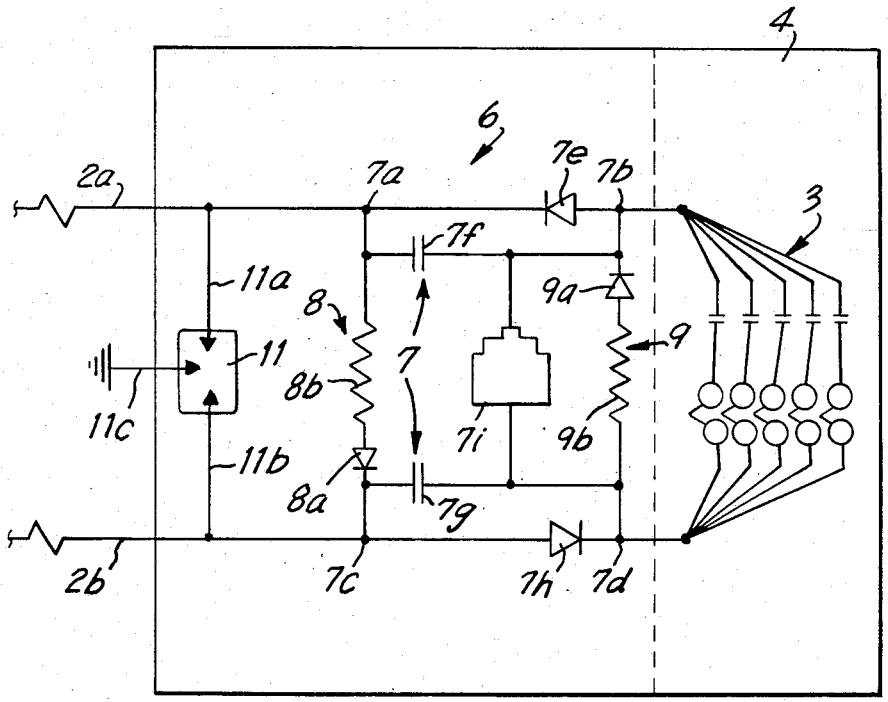
FIG. 2 shows a circuit embodiment of the fault isolation apparatus employed in the system shown in FIG. 1.

FIG. 2 shows an embodiment of the fault isolation apparatus 6 wherein the devices 8 and 9 are as shown in FIG. 1 and the fault isolator 7 comprises discrete components. Thus, as shown, the isolator 7 includes a first diode 7e connected between the ports 7a and 7b and poled in the direction of the former port. In parallel with the diode 7e is a capacitor 7f. A further capacitor 7g is connected across ports 7c and 7d. This capacitor, in turn, is parallelled by a further diode 7h. In a typical case, the diodes 7e and 7h might be high reverse impedance diodes rated at 600 to 1000 VDC. The capacitors 7f and 7g, in turn, might typically be 8uF capacitors rated at 300 VDC.

In the FIG. 2 embodiment, the isolation apparatus 6 also includes a conventional jack 7i. The jack 7i might typically be an RJ 11 jack and provides the subscriber location with duplicate isolation capabilities. Such a jack could also be utilized with the chip form of the apparatus 6 as well as with the modified form of the apparatus 6 shown in FIG. 3.

Figure 3:
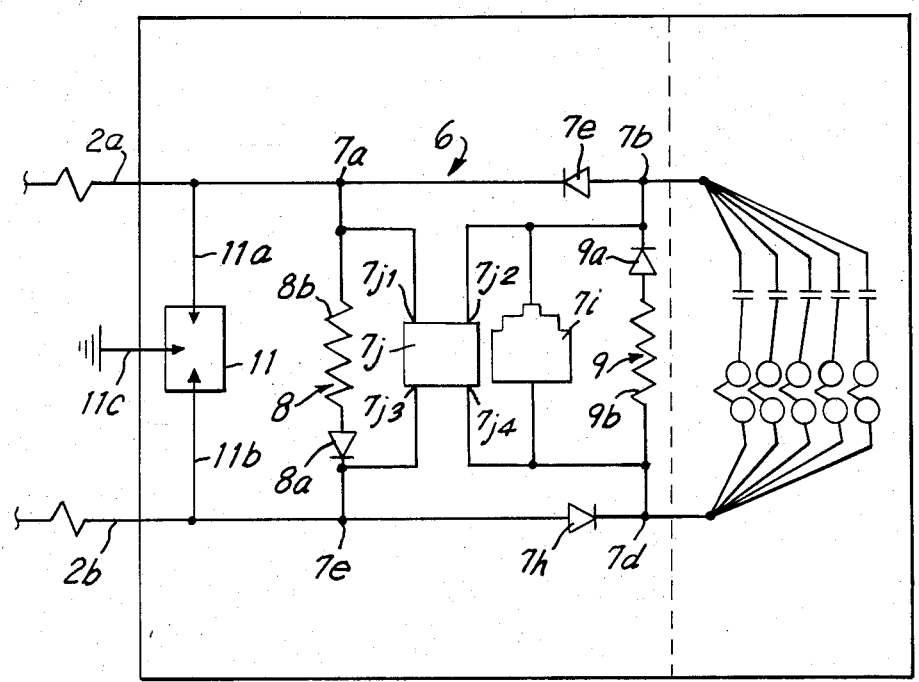
FIG. 3 shows a second emobdiment of the fault isolation apparatus shown in FIG. 1.

The apparatus 6 shown in FIG. 3 is the same as the apparatus 6 of FIG. 2, except that the capacitors 7f and 7g are now provided by an electronic chip 7j. In this case, the chip has ports $7j_1$, $7j_2$, $7j_3$ and $7j_4$. The characteristics of chip 7j can be as follows: with a low frequency signal of less than 20 Hz applied the impedance between ports $7j_1$ and $7j_2$ and between ports $7j_3$ and $7j_4$ is less than 10 ohms for currents in both directions and the impedance between all other pairs of the ports $7j_1$, $7j_2$, $7j_3$ and $7j_4$ is greater than 10 megaohms; with no low frequency signal applied and only a d.c. signal applied, the impedance between all pairs of ports $7j_1$, $7j_2$, $7j_3$ and $7j_4$ is greater than 10 megaohms.

Figure 4:
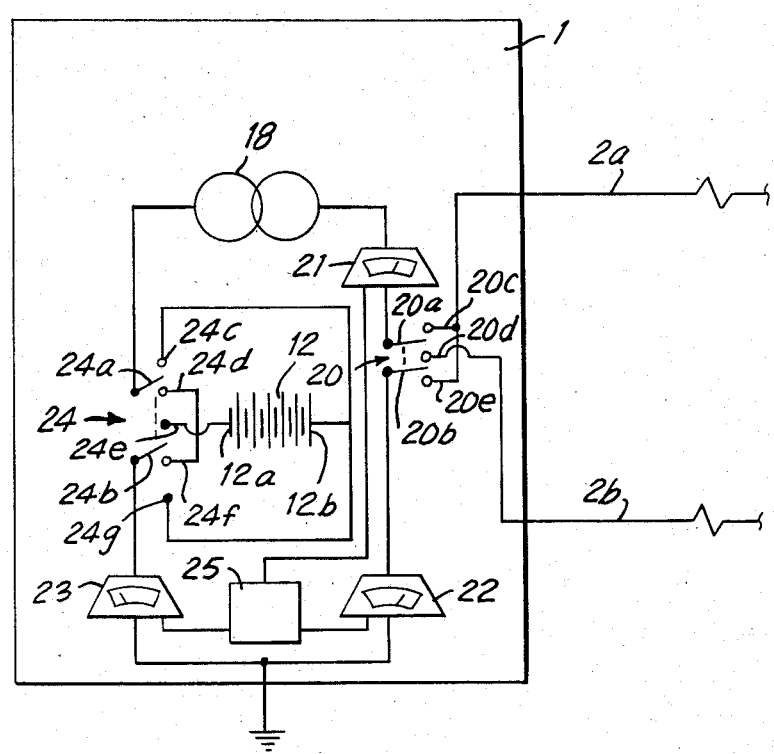
FIG. 4 illustrates a futher embodiment of the current measurement and voltage source devices used in the system of FIG. 1.

FIG. 4 shows a modification of the equipment utilized in the central office 1 for applying voltages and recording currents passing on the tip and ring lines 2b and 2a. In this case, a double throw double pole primary conductor switch 20 has two of its stationary contacts 20c and 20e connected together and to the ring line 2a, and its third stationary contact 20d connected to the tip line 2b. The movable contacts 20a and 20b of the switch 20, in turn, are connected to first terminals of current meters 21 and 22, respectively.

A second terminal of the meter 22 connects to ground as does a terminal of a third current meter 23. The other terminal of the latter meter 23 is connected to a movable contact 24b of a triple throw double pole polarity switch 24. The other movable contact 24a of the switch 24 connects to one end of a.c. source 18 whose other end connects to a second terminal of the current meter 21.

In a first position, the movable contacts 24a and 24b connect to stationary contacts 24c and 24e of the switch 24. In a second position, the contacts 24a and 24b connect to the stationary contacts 24d and 24f of the switch 24 and in a third and final position to the stationary contacts 24e and 24g. The stationary contact 24e is connected to the negative terminal 12a of the battery 12, while the stationary contacts 24c and 24g are connected to the positive terminal 12b of the battery. The terminals 24d and 24f, in turn, are connected together. A comparator 25 is connected to the meters 21-23 to compare the meter readings.

As can be appreciated, with the circuit configuration of FIG. 4, in the first position of the movable contacts 24a and 24b, the switch 24 connects the movable contacts 20a and 20b to the positive battery terminal 12b and to ground, respectively. Depending upon the positions of the contacts 20a and 20b in relation to the stationary contacts 20c, 20d and 20e the tip and ring lines 2b and 2a will then be connected to the positive battery terminal and ground, respectively, or to ground and the positive battery terminal, respectively. In the second position of the movable contacts 24a and 24b, the contacts are connected together so that the battery 12 is taken out of the circuit leaving only the a.c. source 18 and meters 21-23. Finally, in the third position of the contacts 24a and 24b, the negative battery terminal is connected to the contact 20c and ground is connected to contact 20b. In this case, therefore, the tip and ring lines 2b and 2c are connected by the switch 20 to the negative battery terminal and to ground, respectively, or vice versa.

The comparator 25 acts to compare the measured readings of the meters 21-23 for the various test conditions obtained with the switches 20 and 24. In this way true and accurate impedance values corresponding to the tip to ring, tip to ground, ring to ground impedances can be realized.

As can be appreciated, the apparatus of the invention allows fault isolation to be effected by utilizing reverse bias voltages applied to the tip and ring lines 2a and 2b in combination with the passive fault isolation apparatus 6. This result is thus accomplished with an apparatus which is of relatively simple construction and thus affords significant benefits in terms of size, cost, reliability and universality of application. The overall result is therefore a significant savings to the telephone company.

In all cases it is understood that the above-described arrangements are merely illustrative of the many possible specific embodiments which represent applications of the present invention. Numerous and varied other arrangements, can readily be devised in accordance with the principles of the present invention without departing from the spirit and scope of the invention. Thus, for example, in the embodiment of the apparatus in FIG. 2, a solid metal oxide overvoltage protector might be incorporated into the device across ports 7a and 7c. Furthermore, the diodes of the device might be replaced by other conventional unidirectional current conducting devices or by triacs. Finally, each capacitor 7f and 7g in FIG. 2 might be replaced by a silicon controlled rectifier poled in a direction opposite to that of the diode which the capacitor parallels and having a gate which switches the rectifier to a low impedance during ringing.

What is claimed is:

1. A fault location system comprising:
   a telephone central office;
   a subscriber location;
   a subscriber loop connecting said central office to said subscriber location, said subscriber loop including tip and ring lines;
   and means for identifying faults as located on the subscriber loop or at the subscriber location including:
   first means for applying voltages of opposite polarity to said tip and ring lines;
   and fault isolation means including:
   a fault isolator having means for blocking passage of current through said tip line during application of voltage of a first polarity to said tip line and for permitting passage of current through said tip line during application of voltage of a second polarity opposite said first polarity to said tip line and means for permitting passage of current through said ring line during application of voltage of said first polarity to said ring line and for blocking passage of current through said ring line during application of voltage of said second polarity to said ring line, said fault isolator comprising: first and second ports, said first port being connected to the end of said ring line adjacent said subscriber location and said second port being connected to said subscriber location; first circuit means connected between said first and second ports and adapted to allow passage of current from said second to first port and block passage of current from said first to second port during alternative application of said first and second polarity voltages to said ring line; third and fourth ports, said third port being connected to said tip line adjacent said subscriber location and said fourth port being connected to said subscriber location; and second circuit means connected between said third and fourth ports and adapted to allow passage of current from said third to said fourth port and block passage of current from said fourth to said third port during alternative application of said second and first polarity voltages to said tip line;
   third circuit means connected between said first and second ports and adapted to allow passage of low frequency current below a preselected frequency from said first to second port and from second to first port;
   fourth circuit means connected between said third and fourth ports and adapted to allow passage of low frequency current below said preselected frequency from said third to fourth port and from said fourth to third port;
   fifth circuit means connected between said first port and said third port and adapted to allow passage of current from said first to third port and to block passage of current from said third to first port;
   and sixth circuit means connected between said second port and said fourth port and adapted to allow passage of current from said fourth to said second port and to block passage of current from said second to said fourth port.

2. A system in accordance with claim 1 wherein: said first polarity is a negative polarity and said second polarity is a positive polarity.

3. A system in accordance with claim 1 wherein: said first circuit means is a diode poled to pass current from said second to said first port; and said second circuit means is a diode poled to pass current from said third to said fourth port.

4. A system in accordance with claim 1 wherein: said fault isolator comprises an electronic chip having said first, second, third and fourth ports, said chip exhibiting: an impedance to said low frequency current of less than 10 ohms for current passing in either direction between said first port and said second port and for current passing in either direction between said third port and said fourth port and of greater than 10 megaohms for current passing in either direction between any other pairs of said first, second, third and fourth ports; and an impedance to d.c. current of less than 10 ohms for currents passing from said second to first port and from said third to fourth port and of greater than 10 megaohms for current passing in either direction between any other pairs of said first, second, third and fourth ports.

5. A system in accordance with claim 1 wherein:
said first circuit means comprises a diode poled to pass current from said second to said first port;
said second circuit means comprises a diode poled to pass current from said third to said fourth port;
and said third and fourth circuit means comprise an electronic chip exhibiting: an impedance to said low frequency current of less than 10 ohms for current passing in either direction between said first port and said second port and for current passing in either direction between said third port and said fourth port and greater of than 10 megaohms for current passing in either direction between any other pairs of said first, second, third and fourth ports; and an impedance to d.c. current of greater than 10 megaohms for current passing in either direction between any pairs of said first, second, third and fourth ports.

6. A system in accordance with claim 1 wherein:
said first circuit means is a diode poled to pass current from said second to said first port;
said second circuit means is a diode poled to pass current from said third to said fourth port;
and said third and fourth circuit means each comprise a capacitor.

7. A system in accordance with claim 1 wherein:
said fifth circuit means exhibits a first preselected resistance during passage of current;
and said sixth circuit means exhibits a second preselected resistance during passage of current.

8. A system in accordance with claim 7 wherein:
said fifth circuit means comprises a serial connection of a first resistor and a first diode, said first resistor having said first preselected resistance and said first diode being poled to pass current from said first port to third port;
and said sixth circuit means comprises a serial connection of a second resistor and a second diode, said second resistor having said second preselected resistance and said second diode being poled to pass current from said fourth port to said second port.

9. A fault location system comprising:
a telephone central office;
a subscriber location;
a subscriber loop connecting said central office to said subscriber location, said subscriber loop including tip and ring lines;
and means for identifying faults as located on the subscriber loop or at the subscriber location including:
first means for applying voltages of opposite polarity to said tip and ring lines, said means for applying voltages comprising a d.c. voltage source having positive and negative terminals, first and second current meters connected between said positive terminal and negative terminal of said battery and said tip and ring lines, and a switch means connected between said d.c. voltage source and said tip and ring lines, said switch means comprising: a first switch having a first contact and second, third and fourth stationary contacts, said first contact being movable between said second, third and fourth stationary contacts and being connected to said first current meter and said second, third and fourth stationary contacts being connected to said tip line, said ring line and ground, respectively; a second switch having a further first contact and further second, third and fourth stationary contacts, said further first contact being movable between said further second, third and fourth stationary contacts and being connected to said second current meter and said second, third and fourth stationary contacts being connected to said ring line, said tip line and ground, respectively;
and fault isolation means including a fault isolator having means for blocking passage of current through said tip line during application of voltage of a first polarity to said tip line and for permitting passage of current through said tip line during application of voltage of a second polarity opposite said first polarity to said tip line and means to permitting passage of current through said ring line during application of voltage of said first polarity to said ring line and for blocking passage of current through said ring line during application of voltage of said second polarity to said ring line.

10. A fault location system comprising:
a telephone central office;
a subscriber location;
a subscriber loop connecting said central office to said subscriber location, said subscriber loop including tip and ring lines;
and means for identifying faults as located on the subscriber loop or at the subscriber location including:
first means for applying voltages of opposite polarity to said tip and ring lines, said means for applying voltages comprising: a d.c. voltage source; a first switch means having first and second movable contacts and third, fourth, fifth, sixth and seventh stationary contacts, said third and seventh stationary contacts being connected together and to the positive terminal of said voltage source and said fourth and sixth stationary contacts being connected together, said fifth contact being connected to the negative terminal of said battery, and said first and second movable contact having a first position whereat said first and second movable contacts connect to said third and fifth stationary contacts, respectively, a second position whereat said first and second movable contacts connect to said fourth and sixth stationary contacts, respectively, and a third position whereat said first and second movable contacts connect to said fifth and seventh contacts, respectively; a second switch means having further first and second movable contacts connected to said first and second contacts and further third, fourth and fifth stationary contacts, said further third and fifth stationary contacts being connected together and to said ring line and said further fourth stationary contact being connected to said tip line, and said further first and second movable contacts having a first position whereat said further first and second movable contacts connect to said further third and fourth stationary contacts and a second position whereat said further first and second movable contacts connect to said further fourth and fifth stationary contacts; a first current meter in the line between said first movable contact and said further first movable contact; and a second current meter in the line between said second movable contact and said further second movable contact;

and fault isolation means including a fault isolator having means for blocking passage of current through said tip line during application of voltage of a first polarity to said tip line and for permitting passage of current through said tip line during application of volatage of a second polarity opposite said first polarity to said tip line and means for permitting passage of current through said ring line during application of voltage of said first polarity to said ring line and for blocking passage of current through said ring line during application of voltage of said second polarity to said ring line.

11. A fault isolator for connection between a subscriber loop including tip and ring lines and a subscriber location, said fault isolator comprising:
first and second ports, said first port being adapted to be connected to the end of said ring line adjacent said surscriber location and said second port being adapted to be connected to said subscriber location;
first circuit means connected between said first and second ports and adapted to allow passage of current from said second to first port and block passage of current from said first to second port;
third and fourth ports, said third port being adapted to be connected to said tip line adjacent said subscriber location and said fourth port being adapted to be connected to said subscriber location;
second circuit means connected between said third and fourth ports and adapted to allow passage of current from said third to said fourth port and block passage of current from fourth to said third port;
third circuit means connected between said first and second ports and adapted to allow passage of low frequency current below a preselected frequency from said first to second port and from second to first port;
fourth circuit means connected between said third and fourth ports and adapted to allow passage of low frequency current below said preselected frequency from said third to fourth port and from said fourth to third port;
fifth circuit means connected between said first port and said third port and adapted to allow passage of current from said first to third port and to block passage of current from said third to first port;
and sixth circuit means connected between said second port and said fourth port and adapted to allow passage of current from said fourth to said second port and to block passage of current from said second to said fourth port.

12. A fault isolator in accordance with claim 11 wherein:
said fault isolator comprises an electronic chip having said first, second, third and fourth ports, said chip exhibiting: an impedance to said low frequency current of less than 10 ohms for current passing in either direction between said first port and said second port and for current passing in either direction between said third port and said second port and of greater than 10 megaohms for current passing in either direction between any other pairs of said first, second, third and fourth ports; and an impedance to d.c. current of less than 10 ohms for current passing from said second to first port and from said third to fourth port and of greater than 10 megaohms for current passing in either direction between any other pairs of said first, second, third and fourth ports.

13. A fault isolator in accordance with claim 11 wherein:
said first circuit means comprises a diode poled to pass current from said second to said first port;
said second circuit means comprises a diode poled to pass current from said third to said fourth port;
and said third and fourth circuit means comprise an electronic chip exhibiting: an impedance to said low frequency current of less than 10 ohms for current passing in either direction between said first port and said second port and for current passing in either direction between said third port and said fourth port and of greater than 10 megaohms for currents passing in either direction between any other pairs of said first, second, third and fourth ports; and an impedance to d.c. current of greater than 10 megaohms for current passing in either direction between any other pairs of said first, second, third and fourth ports.

14. A fault isolator in accordance with claim 11 wherein;
said first circuit means is a diode poled to pass current from said second to said first port;
said second circuit means is a diode poled to pass current from said third to said fourth port;
and said third and fourth circuit means each comprise a capacitor.

15. A fault isolator in accordance with claim 11 wherein:
said fifth circuit means exhibits a first preselected resistance during passge of current;
and said sixth circuit means exhibits a second preselected resistance during passage of current.

16. A fault isolator in accordance with claim 15 wherein:
said fifth circuit means comprises a serial connection of a first resistor and a first diode, said first resistor having said first preselected resistance and said first diode being poled to pass current from said first port to third port;
and said sixth circuit means comprises a serial connection of a second resistor and a second diode, said second resistor having said second preselected resistance and said second diode being poled to pass current from said fourth port to said second port.

17. A fault isolator in accordance with claim 11 wherein:
said first circuit means is a diode poled to pass current from said second to first port;
and said second circuit means is a diode poled to pass current from said third to fourth port.

18. A system in accordance with claim 10 further comprising:
a third current meter in the line between said second current meter and said further second movable contact, the line between said second and third current meters being grounded.

19. A system in accordance with claim 18 further comprising:
an a.c. source in the line between said first current meter and said first movable contact;
and a comparator connected to said first, second and third current meters.

* * * * *